United States Patent [19]

Arihara

[11] 4,435,013

[45] Mar. 6, 1984

[54] RECLINER-BACK TILTING MECHANISM

[75] Inventor: Takumi Arihara, Yokohama, Japan

[73] Assignee: Ikeda Bussan Co., Ltd., Yokohama, Japan

[21] Appl. No.: 276,281

[22] Filed: Jun. 22, 1981

[30] Foreign Application Priority Data

Jun. 21, 1980 [JP] Japan .................................. 55-84239

[51] Int. Cl.³ ............................................. A47C 1/026
[52] U.S. Cl. ..................................... 297/364; 16/327
[58] Field of Search ................................. 297/363–371, 297/374, 355; 16/327, 332, 333, 325

[56] References Cited

U.S. PATENT DOCUMENTS 3,008,765 11/1961 Tischler et al. ..................... 297/367
3,737,946 6/1973 Guiliani .......................... 297/367 X
4,103,970 8/1978 Homier ............................... 297/363

*Primary Examiner*—William E. Lyddane
*Attorney, Agent, or Firm*—Jordan and Hamburg

[57] ABSTRACT

A recliner mechanism including an arm which is pivotally mounted to a base plate, and includes toothed locking mechanism that permits positive and smooth tilting of the arm with the user feeling a clicking motion and that also protects the teeth of retaining members of the locking mechanism from damage durng the tilting operation.

14 Claims, 5 Drawing Figures

RECLINER-BACK TILTING MECHANISM

TECHNICAL FIELD

The present invention generally relates to the field of recliners or reclining seats, and more specifically to a tilting mechanism adapted to be used in such recliners, which permits the back of a recliner to tilt smoothly and positively in order to select an angular position thereof for best sitting comfort in the recliner.

BACKGROUND OF THE INVENTION

Heretofore, various many types of such recliner-back tilting mechanisms have been proposed; one of them is disclosed in the Japanese Patent Laid-Open Publication No. Sho 53-95744, for example, according to which a base plate is fixed to the frame side face of the seat of a recliner, and an arm is fixed to the frame side face of the back, said arm being pivotably mounted on a shaft fixed to the base plate. In order to retain or free the arm against or for pivoting with respect to the base plate, the arm has formed in one end thereof an open circular hole on the entire inner circumference of which inner teeth are formed, and retainers in pair having outer teeth formed thereon which are in mesh with said inner teeth, are so disposed between guide faces for each of them on said base plate to be away from each other in symmetry with respect to the shaft. Furthermore, there is provided a rotary cam mechanism which permits said retainers to move toward each other to provide disengagement between said inner and other teeth, while permitting said retainers to move away from each other to make said inner and outer teeth engage with each other. An operating lever for control of said rotary cam mechanism is installed to the base plate by means of a spring for securing the lever in place.

In such prior-art recliner-back tilting mechanisms, however, although there are formed, as described above, teeth along the entire circumference of the circular opening in the arm end, all these teeth are identical and thus only some of them contribute to tilting of the back of a recliner. Further, simultaneous engagement between the outer and inner teeth will gradually be unsuccessful because the teeth deteriorate due to the weight of the recliner back as well as to the repeated operation, resulting eventually in damage to the teeth.

SUMMARY OF THE INVENTION

Accordingly, the present invention has the primary object to overcome the above-mentioned drawbacks of the prior-art recliner-back tilting mechanisms by providing a novel and improved recliner-back tilting mechanism of which the retaining mechanism necessary for tilting the recliner back is simplified but permits the back to tilt smoothly and positively to a desired angular position.

Other objects and advantages of the present invention will be better understood from the ensuing description made, by way of example, of the preferred embodiments according to the present invention with reference to the accompanying drawings.

DESCRIPTION OF THE PREFERRED EMBODIMENTS

Figure 1:
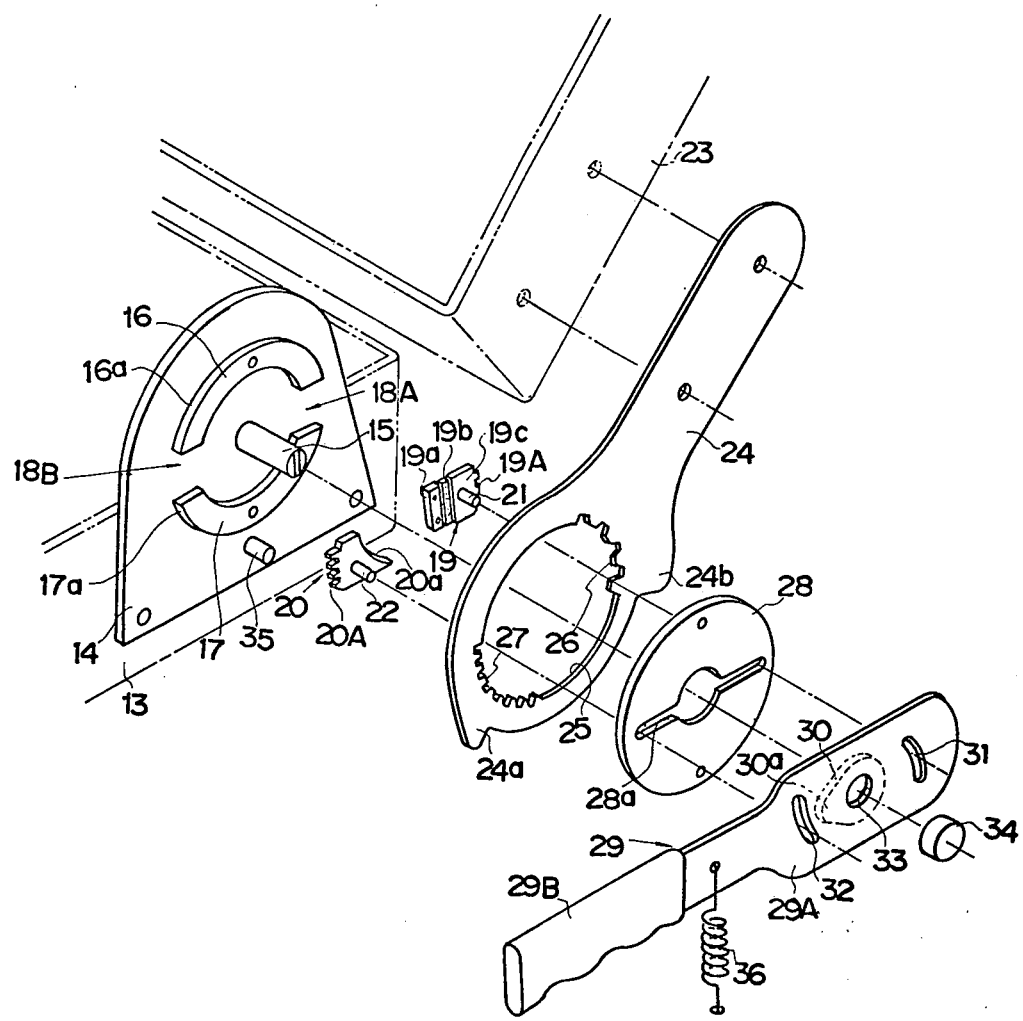
FIG. 1 is an exploded, perspective view of one embodiment of the recliner-back tilting mechanism according to the present invention.

Referring now to FIG. 1, the inventive mechanism for a recliner comprises a base plate 14 which is fixed to the cushion frame 13 of a seat. Said base plate 14 has provided at the center thereof a horizontally extending shaft 15 around which is provided a pair of arched guide members 16 and 17. These guide members 16 and 17 define together guide ways 18A and 18B into which first and second retaining members 19 and 20 can be inserted. These retaining members 19 and 20 are provided there to be movable toward and/or away from each other with respect to said shaft 15.

Said first retaining member 19 is composed of a support plate 19a secured to the base plate 14, and elastic piece 19b made of a material such as rubber and carried by the support plate 19a, and an end piece 19c which in turn is carried by the elastic piece 19b. Said end piece 19c is provided with a first set of outer teeth 19A at the outer end thereof, and also with a first engagement pin 21 extending horizontally.

Said second retaining member 20 is provided at the inner end thereof with a circumference 20a so curved as to be nearer said shaft 15 at the lower portion thereof than at the upper portion, and at the outer end thereof with a second set of outer teeth 20A. The second retainer 20 is also provided with a second engagement pin 22 extending horizontally. It should be noted that the working depth of the second set of teeth 20A on the second retaining member 20 is selected to be approximately 2 times greater than that of the first set of outer teeth 19A on said first retaining member 19 and that the first set of outer teeth 19A are shaped as a wave for ease of sliding.

Fixed to the frame 23 of the recliner back is an arm 24 in one end of which is formed a circular hole 25 which is to surround the corresponding outer circumferences 16a and 17a of said guide pieces 16 and 17 fixed to said base plate 14, thereby permitting the arm 24 to be pivotable around said shaft 15. Further, said circular opening 25 has formed along the inner circumference thereof a first set of teeth 26 and a second set of teeth 27 which are so disposed there opposite to each other; similar to the above-mentioned relation in depth between said outer teeth 19A and 20A, the depth of the second set of teeth 27 is selected to be nearly 2 times greater than that of the first set of teeth 26, and also similar to the outer teeth 19A, the teeth 26 are shaped for smooth sliding. It should be remembered here that the teeth 26 and 27 are identical in pitch to the corresponding outer teeth 19A and 20A.

Further, to prevent the first and second retaining members 19 and 20 and the arm 24 from freely moving mainly along the axis of the shaft 15, a plate holder 28 with an opening 28a in the center thereof is to be fixed to the base plate 14.

An operating lever 29 is provided so as to be pivotable around the shaft 15 by raising the grip 29B or under the returning action of a spring 36, and also extended by an actuating plate 29A which has formed in the center thereof a shaft receiving hole 33 in a coaxial relation with which there is fixed to said actuating plate 29A a collar 30 in opposition to the base plate 14. There are formed first and second slots 31 and 32 in the actuating plate 29A on either side of the collar 30. These slots 31 and 32 are so curved as to be nearer the shaft receiving hole 33 at one end thereof than the other. The slots 31 and 32 are to be engaged on the corresponding engagement pins 21 and 22 on said first and second retaining members 19 and 22. Said collar 30 is formed, as illustrated, to be asymmetrical; the elongated or protruding portion 30a thereof is to be in contact with the inner circumference 20a of said second retaining member 20. Further, the operating lever 29 is limited by a fastener 34 from freely moving along the axis of said shaft 15. It should be noted that a return spring (not shown) is fixed at one end thereof to the arm 24 so that the latter is always forced to tilt pivoting toward the cushion frame 13 of the seat. There is provided at the lower portion of the base plate 14 a horizontally extending stopper 35 which will engage with engagement protrusions 24a and 24b formed one at the lower end of the arm 24 and the other at the portion near the bottom end of the recliner-back frame, thereby limiting the pivoting range of the arm 24. The operating lever 29 is linked with the base plate by means of a spring 36 which always keeps the lever 29 in place.

Figure 2:
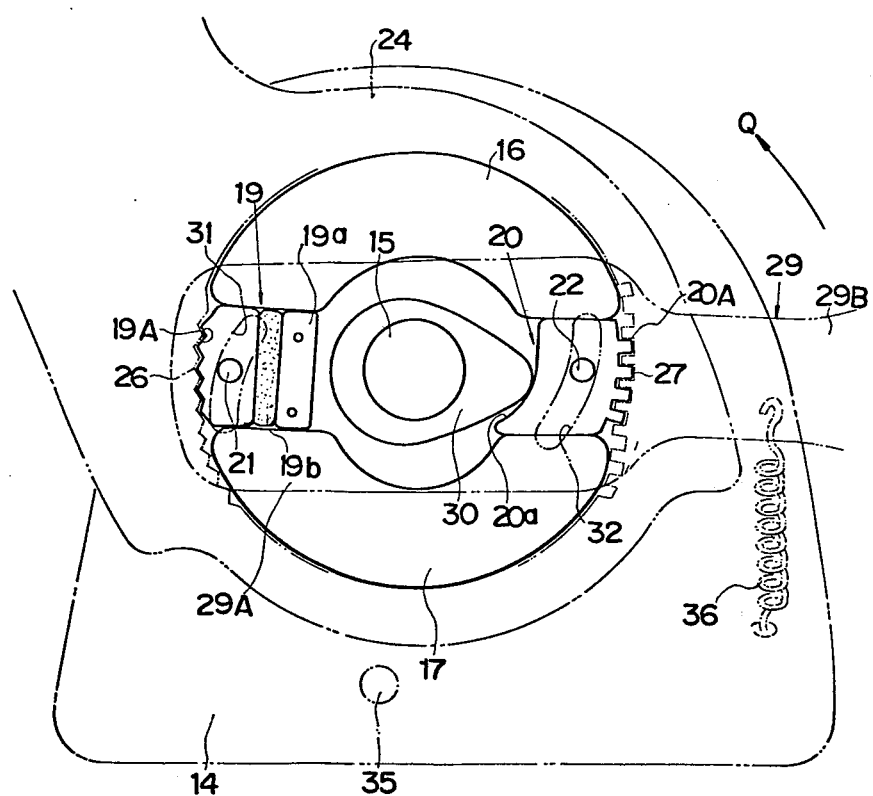
FIG. 2 is a fragmentary rear view, in larger scale, of the retaining mechanism in the recliner-back tilting mechanism of FIG. 1, showing that the arm is in retained position.

The recliner-back tilting mechanism according to the present invention will function as follows:

First of all, when the first and second retaining members 19 and 20 are in complete mesh at the first and second outer teeth 19A and 20A thereof with the corresponding first set of teeth 26 and second set of teeth 27 along the inner circumference of said circular opening 25 in the end of the arm 24 as shown in FIG. 2, the latter is retained on the base plate 14, so that the recliner back will not be tilted.

By raising the grip handle 29B of the operating lever 29 in the direction of arrow Q, the second engagement pin 22 is moved as guided in the second slot 32 so that the second retaining member 20 will move in the direction of the shaft 15. Further rise of the operating lever 29 to a predetermined position will cause the second outer teeth 20A to completely be disengaged from the second set of teeth 27; in this case, since the first retaining member 19 is forced away from the shaft 15 under the action of the support plate 19a and the elastic piece 19b, the first set of outer teeth 19A will not readily be disengaged from the first set of teeth 26. However, the shaft will be moved only slightly toward the shaft 15 because of the engagement between the first slot 31 and first engagement pin 21. Here, the first retaining member 19 remains in a state in which its first set of outer teeth 19A is in a slight mesh with the corresponding first set of teeth 26; however, since the first set of outer teeth 19A and first set of teeth 26 are small in working depth and have smooth addendums, and the first retaining member 19 is elastically supported, if the second retaining member 20 is completely unmeshed at the teeth thereof, the arm 24 can be freely pivoted. When the arm 24 is thus pivoted, the slight meshing of the first set of outer teeth 19A with the first outer teeth 26 will cause the user to feel notching or clicking. Confirming, from this feeling, that the arm 24 is pivoting, the user can tilt the recliner back to a desired angular position within an adjustable range defined with the second set of teeth 27, then lock the recliner back there. And the arm 24 is retained in an appropriate corresponding position.

As previously mentioned, the first and second outer teeth 19A and 20A of the first and second retaining members 19 and 20, respectively, are identical in pitch to the corresponding first set of teeth 26 and second set of teeth 27, respectively. Thus, when the second set of outer teeth 20A and second set of teeth 27 are in contact with each other at their respective addendums, the first set of outer teeth 19A and the first set of teeth 26 are in contact with each other at their respective addendums so that the arm 24 will not be retained due to the meshing of the first retaining member 19 at the outer teeth there of with the corresponding outer teeth. In case the recliner back is to be tilted through a large angle, the engagement protrusion 24b of the arm 24 is let to rest on the stopper 35 with all the outer teeth 20A of the second retaining member 20 made to abut the inner circumferential portion of the circular opening 25 along which no inner teeth are formed. No fine adjustment is required of the tilt angle when the recliner back is tilted through the large angle over the adjustable range. In this case, since no engagement of the first retaining member 19 is of course necessary, there is no necessity of forming inner teeth like those 26 along the corresponding inner circumferential portion of the circular opening 25.

Figure 3:
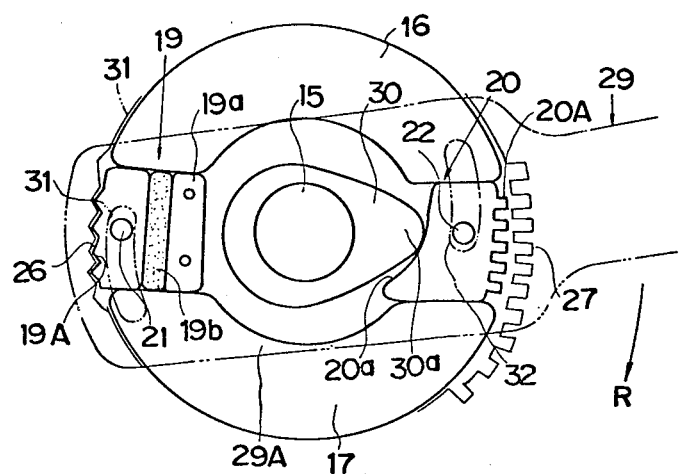
FIG. 3 is a similar fragmentary rear view, in larger scale, of the retaining mechanism in the recliner-back tilting mechanism of FIG. 1, showing that the arm is in free position.

To lock the recliner back in a desired angular position, the operating lever 29 is to be pivoted in the direction of arrow R under the force of the spring 36 as shown in FIG. 3. Then, the protrusion 30a of the collar 30 will pivot in the pivoting direction of the actuating plate 29A while being in contact with the inner circumferential face 20a of the second retaining member 20, so that the second retaining member 20 moves away from the shaft 15. Feeling a notching or clicking created from the slight meshing of the first retaining member 19 at the first outer teeth thereof with the corresponding inner teeth of the arm 24, namely, feeling the sliding of the first set of outer teeth 19A at the addendums thereof on the addendums of the first set of teeth 26 in relation to each other, the user confirms that the outer teeth 19A may be in mesh with the first set of teeth 26, then returns the operating lever 29 fully to the initial position. Thus, the outer teeth 20A of the second retaining member 20 can be made to smoothly engage with the second set of teeth 27; therefore, the outer teeth 20A of the second retaining member 20 will not possibly be damaged.

Figure 4:
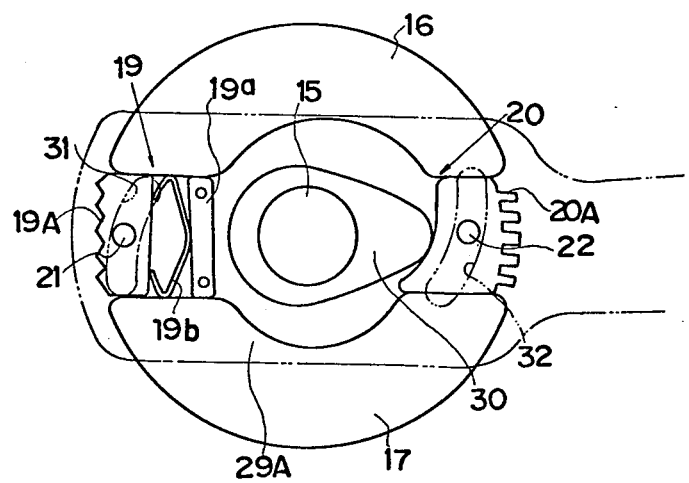
FIGS. 4 and 5 are fragmentary rear views, in larger scale, of other embodiments of the inventive retaining mechanisms, respectively.
Figure 5:
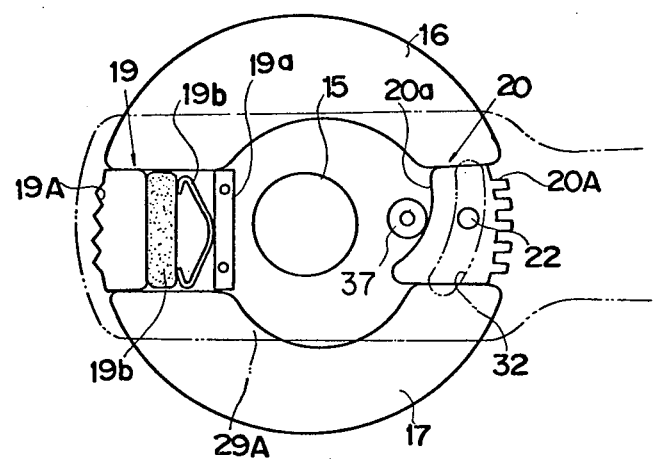

FIGS. 4 and 5 are fragmentary views, in larger scale, of other embodiments according to the present invention. In the embodiment shown in FIG. 4, the elastic piece 19b forming part of the first retaining member 19 is made of a leaf spring. This leaf spring is carried by the support plate 19a secured to the base plate 14. In the embodiment illustrated in FIG. 5, a roller 37 is used in lieu of said collar 30, which is pivotably mounted on the actuating plate 29A so as to roll on the inner circumference 20a of the second retaining member 20, and the first retaining member 19 comprises a leaf spring and rubber plate as elastic pieces, these being carried by the support plate 19a. Furthermore, the first slot 31 in the actuating plate 29A is eliminated in this embodiment. This is because it suffices that the first retaining member is easily disengageable when the arm is not retained; in principle, the first retaining member 19 has only to be elastically supported.

As having been described in the foregoing, the present invention proposes a new and improved concept that one of the retaining members in pair, which are to retain and/or free the arm of the recliner back by the engagement and/or disengagement between the teeth, is so arranged as to be more easily disengageable than the other retaining member. Thus, the recliner back can be tilted positively and smoothly by the user while feeling a notching or clicking motion of the inventive mechanism, and also the teeth of the retaining members can be protected against damages which would occur during the operation of any prior-art recliner-back tilting mechanisms.

What is claimed is:

1. A mechanism for a recliner, comprising:
   (A) a base plate secured to a seat of the recliner;
   (B) an arm with one end pivotally mounted on said base plate and another end affixed to the recliner, said arm having a substantially circular opening concentric with the pivotal center of the arm;
   (C) a first set of teeth formed along a section of said opening;
   (D) a second set of teeth formed along a section of said opening substantially opposite said first set of teeth and substantially identical in pitch;
   (E) a first retaining member having a first set of outer teeth adapted to be forced toward said first set of teeth (C) to be in mesh with said first set of teeth (C);
   (F) a second retaining member having a second set of outer teeth for engaging at least a portion of said second set of teeth (D) to secure said arm (B) at a desired position; and
   (G) means for moving said second retaining member (E) to engage said respective second sets of teeth to prevent angular movement of said arm (B), and to release engagement between said respective second sets of teeth to permit angular movement of said arm (B), at least a portion of said means disposed within said substantially circular opening in said arm (B);
   said first and second retaining members (E) and (F) disposed in said substantially circular opening and adjustably supported in a plane including said opening; and
   said first retaining member (E) adjustably supported in a plane including said opening with said first respective sets of teeth remaining slidingly meshed, even when said second respective sets of teeth are disengaged, allowing said arm (B) to pivot.

2. The mechanism of claim 1 in which
   (F) said first retaining member comprises
   (1) a support plate secured to said base plate (A);
   (2) at least one elastic piece carried by said support plate (F)(1); and
   (3) an end piece carried by said elastic piece (F)(2), with said first set of outer teeth disposed at the outer end of said end piece (F)(3).

3. The mechanism of claim 2 in which said respective first sets of teeth are substantially shaped as a wave for ease of sliding, with the depth of said second set of teeth (D) up to approximately twice as great as the depth of said first set of teeth (C).

4. The mechanism of claim 3 in which said base plate (A) comprises a shaft, with said first and second retaining members disposed around said shaft and said shaft extending through the substantially circular opening in said arm (B), and in which said means (G) is in the form of a lever provided with a hole through which said shaft extends.

5. The mechanism of claim 4 in which said elastic piece (F)(2) of said first retaining member (F) comprises a leaf spring and rubber plate, and
   said lever (G) comprises a roller for contacting an inner surface of said second retaining member (F) when the mechanism is locked into place, forcing engagement of said second respective sets of teeth, said inner surface of said second retaining member curved to be closer, at a lower portion thereof, to said shaft.

6. The mechanism of claim 4 additionally comprising a spring connecting said base plate (A) and said lever (G).

7. The mechanism of claim 4 in which said second retaining member is provided with an inner surface curved to be closer, at a lower portion thereof, to said shaft, and
   in which said lever (G) is provided with a collar situated around the hole in the lever, said collar substantially in the shape of a cross-section of an egg, with the more acute end of the collar contacting said second retaining member (F) when the mechanism is locked into place, forcing engagement of said second respective sets of teeth.

8. The mechanism of claim 7 in which said second retaining member (F) is provided with a pin, and said lever (G) is provided with a slot for receiving said pin, said slot curved to be closer, at one end thereof, to the shaft hole in said lever.

9. The mechanism of claim 8 additionally comprising (H) means for preventing movement of said arm (B), first and second retaining members (E) and (F), and lever (G) along the axis of said shaft.

10. The mechanism of claim 9 in which said means (H) comprises a plate situated between said arm (B) and lever (G) and a fastener situated on said shaft on the opposite side of said lever (G) from said plate.

11. The mechanism of claim 9 in which said arm (B) is provided with two protrusions and said base plate (A) is provided with a stopper, said stopper preventing rotation of said arm (B) around said shaft past said protrusions.

12. The mechanism of claim 11 in which said first retaining member (F) is provided with pin, and said lever (G) is provided with an additional slot for receiving said pin, said additional slot curved to be closer, at one end thereof, to the shaft hole in said lever.

13. The mechanism of claim 12 in which said elastic piece (F)(2) of said first retaining member (F) is in the form of a rubber plate.

14. The mechanism of claim 12 in which said elestic piece (F)(2) of said first retaining member (F) is in the form of a leaf spring.

* * * * *